United States Patent
Kurihara et al.

(10) Patent No.: US 10,764,387 B2
(45) Date of Patent: Sep. 1, 2020

(54) PROFILE INFORMATION SYSTEM AND INFORMATION PROCESSING APPARATUS

(71) Applicant: RENESAS ELECTRONICS CORPORATION, Tokyo (JP)

(72) Inventors: Wataru Kurihara, Tokyo (JP); Takehiro Mikami, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/281,878

(22) Filed: Feb. 21, 2019

(65) Prior Publication Data
US 2019/0268425 A1    Aug. 29, 2019

(30) Foreign Application Priority Data
Feb. 27, 2018   (JP) .................................. 2018-032919

(51) Int. Cl.
*H04L 29/08*      (2006.01)
*H04L 12/28*      (2006.01)

(52) U.S. Cl.
CPC .......... *H04L 67/22* (2013.01); *H04L 12/2823* (2013.01); *H04L 67/306* (2013.01)

(58) Field of Classification Search
CPC .... H04L 67/22; H04L 12/2823; H04L 67/306
USPC ...................................................... 340/539.14
See application file for complete search history.

(56) References Cited

U.S. PATENT DOCUMENTS

| | | | | |
|---|---|---|---|---|
| 2007/0288266 | A1* | 12/2007 | Sysko | G06Q 10/00 705/2 |
| 2012/0030229 | A1* | 2/2012 | Ji | G16H 10/60 707/769 |
| 2014/0129255 | A1* | 5/2014 | Woodson | G06Q 50/24 705/3 |
| 2015/0150074 | A1* | 5/2015 | Nolan | G06F 19/3418 726/1 |
| 2016/0019813 | A1* | 1/2016 | Mullen | G09B 19/00 434/236 |
| 2016/0142478 | A1* | 5/2016 | Miyazaki | A61B 5/0015 709/204 |

FOREIGN PATENT DOCUMENTS

| JP | 2015-005259 A | 1/2015 |
|---|---|---|
| JP | 2016-110186 A | 6/2016 |

* cited by examiner

*Primary Examiner* — Kerri L McNally
(74) *Attorney, Agent, or Firm* — McDermott Will & Emery LLP

(57) ABSTRACT

There is a need to acquire more reliable profile information without relying on only the personal subjective judgment on the profile information. Profile information about a dweller is automatically extracted by evaluating and comprehensively determining each of feature amounts concerning the dweller from sensing data acquired from a sensor or a usage log concerning an equipment instrument in a living space based on a criterion for the feature amounts predetermined for a profile item. The reliability of the self-reported profile information is evaluated by comparing and verifying the automatically extracted profile information with the self-reported profile information supplied by the dweller.

13 Claims, 13 Drawing Sheets

401

| PROFILE ITEM "HEALTH" | | | | |
|---|---|---|---|---|
| EVALUATION ITEM | | SCORE | SENSOR | DETECTION METHOD |
| SLEEP PERIOD | 7 HOURS OR LONGER | 2 | · MOTION DETECTOR<br>· VITAL SENSOR | · DETECTING PERSON ON BED USING ToF SENSOR<br>· DETECTING PULSE WAVE CHANGE OR BODY MOTION USING VITAL SENSOR |
| | 4 TO 7 HOURS | 1 | | |
| | SHORTER THAN 4 HOURS | 0 | | |
| SLEEP DEPTH (PULSE CHANGE DURING SLEEP) | SMALL PULSE CHANGE | 2 | · VITAL SENSOR | · DETECTING PULSE WAVE CHANGE USING VITAL SENSOR |
| | MEDIUM PULSE CHANGE | 1 | | |
| | LARGE PULSE CHANGE | 0 | | |
| BLOOD PRESSURE | LOWER THAN 125/80 mmHg | 2 | · VITAL SENSOR | · ESTIMATED FROM PULSE WAVE DETECTED BY VITAL SENSOR |
| | LOWER THAN 140/90 mmHg | 1 | | |
| | LOWER THAN 180/110 mmHg | 0 | | |
| WEIGHT CHANGE PER MONTH | NO CHANGE | 2 | · CAPACITANCE SENSOR | · MEASURING WEIGHT BASED ON CAPACITANCE CHANGE |
| | LESS THAN ±5 Kg | 1 | | |
| | ±5 Kg OR MORE | 0 | | |
| COMPLEXION CHANGE | NO CHANGE | 2 | · CAMERA (FACIAL RECOGNITION) | · MEASURING COMPLEXION USING VIDEO FROM CAMERA |
| | LESS THAN 10 TIMES | 1 | | |
| | 10 TIMES OR MORE | 0 | | |

| SENSOR | OBSERVATION TARGET |
|---|---|
| ENVIRONMENTAL SENSOR | TEMPERATURE, ILLUMINANCE, HUMIDITY |
| MOTION DETECTOR | EXISTENCE AND MOTION OF PERSON |
| CAMERA | OBJECT RECOGNITION, FACIAL RECOGNITION |
| VITAL SENSOR (CONTACTLESS) | PULSES, BREATHING, ACTIVITY |
| VITAL SENSOR (CONTACT-TYPE) | PULSES, BREATHING, ACTIVITY |

PROFILE ITEM "HEALTH"

| EVALUATION ITEM | | SCORE | SENSOR | DETECTION METHOD |
|---|---|---|---|---|
| SLEEP PERIOD | 7 HOURS OR LONGER | 2 | • MOTION DETECTOR<br>• VITAL SENSOR | • DETECTING PERSON ON BED USING ToF SENSOR<br>• DETECTING PULSE WAVE CHANGE OR BODY MOTION USING VITAL SENSOR |
| | 4 TO 7 HOURS | 1 | | |
| | SHORTER THAN 4 HOURS | 0 | | |
| SLEEP DEPTH (PULSE CHANGE DURING SLEEP) | SMALL PULSE CHANGE | 2 | • VITAL SENSOR | • DETECTING PULSE WAVE CHANGE USING VITAL SENSOR |
| | MEDIUM PULSE CHANGE | 1 | | |
| | LARGE PULSE CHANGE | 0 | | |
| BLOOD PRESSURE | LOWER THAN 125/80 mmHg | 2 | • VITAL SENSOR | • ESTIMATED FROM PULSE WAVE DETECTED BY VITAL SENSOR |
| | LOWER THAN 140/90 mmHg | 1 | | |
| | LOWER THAN 180/110 mmHg | 0 | | |
| WEIGHT CHANGE PER MONTH | NO CHANGE | 2 | • CAPACITANCE SENSOR | • MEASURING WEIGHT BASED ON CAPACITANCE CHANGE |
| | LESS THAN ±5 Kg | 1 | | |
| | ±5 Kg OR MORE | 0 | | |
| COMPLEXION CHANGE | NO CHANGE | 2 | • CAMERA (FACIAL RECOGNITION) | • MEASURING COMPLEXION USING VIDEO FROM CAMERA |
| | LESS THAN 10 TIMES | 1 | | |
| | 10 TIMES OR MORE | 0 | | |

| SUM OF SCORES | |
|---|---|
| 8~10 | VERY HEALTHY |
| 5~7 | HEALTHY |
| 2~4 | ALERT TO HEALTH |
| 0~1 | UNHEALTHY |

| PROFILE ITEM "STRESS" | | | | |
|---|---|---|---|---|
| EVALUATION ITEM | | SCORE | SENSOR | DETECTION METHOD |
| EMOTION | FREQUENTLY FEEL HAPPY | 2 | · VOICE RECOGNITION<br>· CAMERA<br>(FACIAL RECOGNITION) | · RECOGNIZING EMOTION BY VOICE<br>· RECOGNIZING EMOTION BASED ON FACIAL RECOGNITION |
| | FREQUENTLY FEEL CALM | 1 | | |
| | FREQUENTLY FEEL ANGRY | 0 | | |
| PULSE CHANGE WHEN AWAKING | LESS THAN 10% | 2 | · VITAL SENSOR | · DETECTING PULSE WAVE CHANGE USING VITAL SENSOR |
| | 10%~20% | 1 | | |
| | 20% OR MORE | 0 | | |
| SLEEP DEPTH (PULSE CHANGE DURING SLEEP) | SMALL PULSE CHANGE | 2 | · VITAL SENSOR | · DETECTING PULSE WAVE CHANGE USING VITAL SENSOR |
| | MEDIUM PULSE CHANGE | 1 | | |
| | LARGE PULSE CHANGE | 0 | | |
| ACTIVITIES | ACTIVE | 2 | · MOTION DETECTOR<br>· VITAL SENSOR | · DETECTING HUMAN ACTIVITIES USING ToF SENSOR<br>· DETECTING BODY MOTION USING VITAL SENSOR |
| | NORMAL | 1 | | |
| | INACTIVE | 0 | | |
| SHOULDER STIFFNESS | LOW | 2 | · THERMAL CAMERA | · DETECTING DISTRIBUTION OF BODY TEMPERATURE USING THERMAL CAMERA |
| | MEDIUM | 1 | | |
| | HIGH | 0 | | |

| SUM OF SCORES | |
|---|---|
| 8~10 | NO STRESS |
| 5~7 | LOW STRESS |
| 0~4 | HIGH STRESS |

| PROFILE ITEM "PERSONALITY" | | | | |
|---|---|---|---|---|
| EVALUATION ITEM | | SCORE | SENSOR | DETECTION METHOD |
| CHANGE IN WAKE TIME | LESS THAN ±10 MINUTES | 2 | · MOTION DETECTOR<br>· VITAL SENSOR<br>· CAMERA<br>(POSTURE DETECTION) | · DETECTING PERSON USING ToF SENSOR<br>· DETECTING PULSE WAVE CHANGE AND BODY MOTION USING VITAL SENSOR<br>· RECOGNIZING HUMAN POSTURE USING CAMERA |
| | ±10 TO ±30 MINUTES | 1 | | |
| | ±30 MINUTES OR MORE | 0 | | |
| CHANGE IN LIGHTS-OUT TIME | LESS THAN ±10 MINUTES | 2 | · ILLUMINANCE SENSOR | · DETECTING ILLUMINANCE CHANGE IN ROOM USING ILLUMINANCE SENSOR |
| | ±10 TO ±30 MINUTES | 1 | | |
| | ±30 MINUTES OR MORE | 0 | | |
| THE NUMBER OF TIMES TO BRUSH TEETH PER DAY | FIVE TIMES OR MORE | 2 | · CAMERA<br>(POSTURE DETECTION) | · RECOGNIZING HUMAN POSTURE USING CAMERA |
| | TWICE TO FOUR TIMES | 1 | | |
| | ONCE OR NONE | 0 | | |
| AVERAGE TIME TO GO HOME | TILL 19:00 | 2 | · MOTION DETECTOR<br>· CAMERA<br>(FACIAL RECOGNITION)<br>· VOICE RECOGNITION<br>(VOICEPRINT RECOGNITION) | · DETECTING PERSON USING ToF SENSOR<br>· RECOGNIZING FACE USING CAMERA AND RECOGNINZING VOICEPRINT BASED ON VOICE (TO IDENITFY RETURNING PERSON) |
| | 19:00 TO 22:00 | 1 | | |
| | AFTER 22:00 | 0 | | |
| MESSY CONDITION (CHANGE) OF A ROOM | NO CHANGE | 2 | · CAMERA<br>(OBJECT RECOGNITION) | · DETECTING POSITIONAL CHANGE IN OBJECT BASED ON VIDEO FROM CAMERA |
| | SLIGHTLY MESSY | 1 | | |
| | VERY MESSY | 0 | | |

| SUM OF SCORES | |
|---|---|
| 8~10 | WELL-ORGANIZED (TIDY) |
| 5~7 | NORMAL |
| 0~4 | NEGLIGENT |

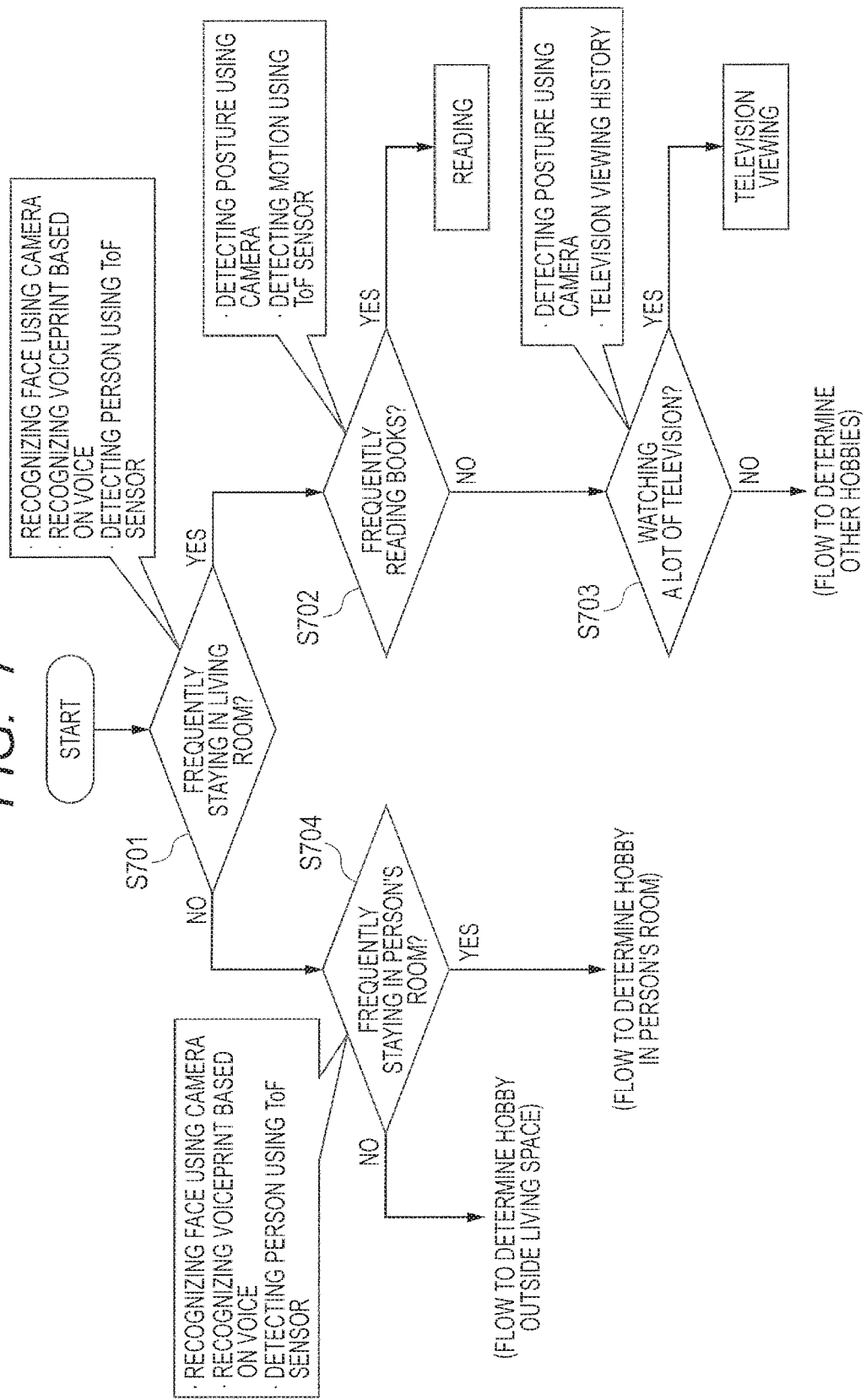

PROFILE INFORMATION SYSTEM AND INFORMATION PROCESSING APPARATUS

CROSS-REFERENCE TO RELATED APPLICATIONS

The disclosure of Japanese Patent Application No. 2018-032919 filed on Feb. 27, 2018 including the specification, drawings and abstract is incorporated herein by reference in its entirety.

BACKGROUND

The present invention relates to a profile information system and an information processing apparatus to automatically extract profile information based on sensor data from an equipment instrument in a living space.

The Internet provides job-placement services for employment or SNS (Social Networking Service) for community formation. When using or joining these services, a user reveals his or her own profile information. The revealed profile information is expected to serve some determination such as matching between a person and a job category or between persons. The profile information the user needs to supply therefore ranges widely from name and birth date to educational background, professional background, lifestyle, and personality. The profile information is self-reported by the user. When needed, the user is requested to disclose the supporting documentary evidence (such as an identification card) to prevent identity fraud. The lifestyle or the personality included in the profile information is based on the subjective judgment of the user. These types of profile information cannot use a system to prevent identity fraud or an established criterion. There may be an unavoidable gap in perception between one to submit the profile information and another to receive the same.

As disclosed in patent literature 1, the behavior of a user is analyzed from the area information visited by the user or keywords posted to SNS. The reliability of the profile information is calculated to provide reliability to the profile information released to SNS.

Patent literature 2 discloses the communication management system to assist in promoting the communication among users. The system dynamically generates communication network information to associate users with each other based on the user's biological information and/or living activities information that is acquired in the daily life of each user. The user information is estimated from a sensor, a microphone, or information about the use of home electronics. For example, the user is estimated to "do housecleaning" when a vacuum cleaner is turned on and a microphone detects operational sound.

Patent Literature 1: Japanese Unexamined Patent Application Publication No. 2016-110186
Patent Literature 2: Japanese Unexamined Patent Application Publication No. 2015-5259

SUMMARY

As above, it is difficult to avoid identity fraud in terms of objectively unconfirmed items in the self-reported profile information revealed by the user. In addition, no objective criterion is available for items subjectively judged by the user. There have been limitations to the reliability of the profile information. According to patent literature 1, the basic information about judgment on the reliability is based on the SNS information posted by the user. Only a limited range of reliability can be requested. Patent literature 2 discloses a communication network formation system and does not particularly examine the reliability of the profile information. Patent literature 2 is cited as known literature to estimate user situations based on information from sensors. However, examples of estimated information include "sneezing" or "using a vacuum cleaner." There is no description of items concerning the profile information such as personality.

These and other objects and novel features may be readily ascertained by referring to the following description of the present specification and appended drawings.

Profile information about a dweller is automatically extracted from sensing data acquired from a sensor or a usage log concerning an equipment instrument in a living space. Moreover, the reliability of self-reported profile information is evaluated by comparing and verifying the automatically extracted profile information with the self-reported profile information supplied by the dweller.

More reliable profile information can be acquired by evaluating an objective life pattern of biological information without relying on only the personal subjective judgment on the profile information.

BRIEF DESCRIPTION OF THE DRAWINGS

FIG. 4A illustrates a feature amount table of profile information "health;"

FIG. 4B illustrates a determination table of profile information "health;"

FIG. 5A illustrates a feature amount table of profile information "stress;"

FIG. 5B illustrates a determination table of profile information "stress;" FIG. 6A illustrates a feature amount table of profile information "personality;"

FIG. 6B illustrates a determination table of profile information "personality;"

FIG. 7 illustrates the flow of a process to determine profile information "hobby;"

DETAILED DESCRIPTION

Figure 1:
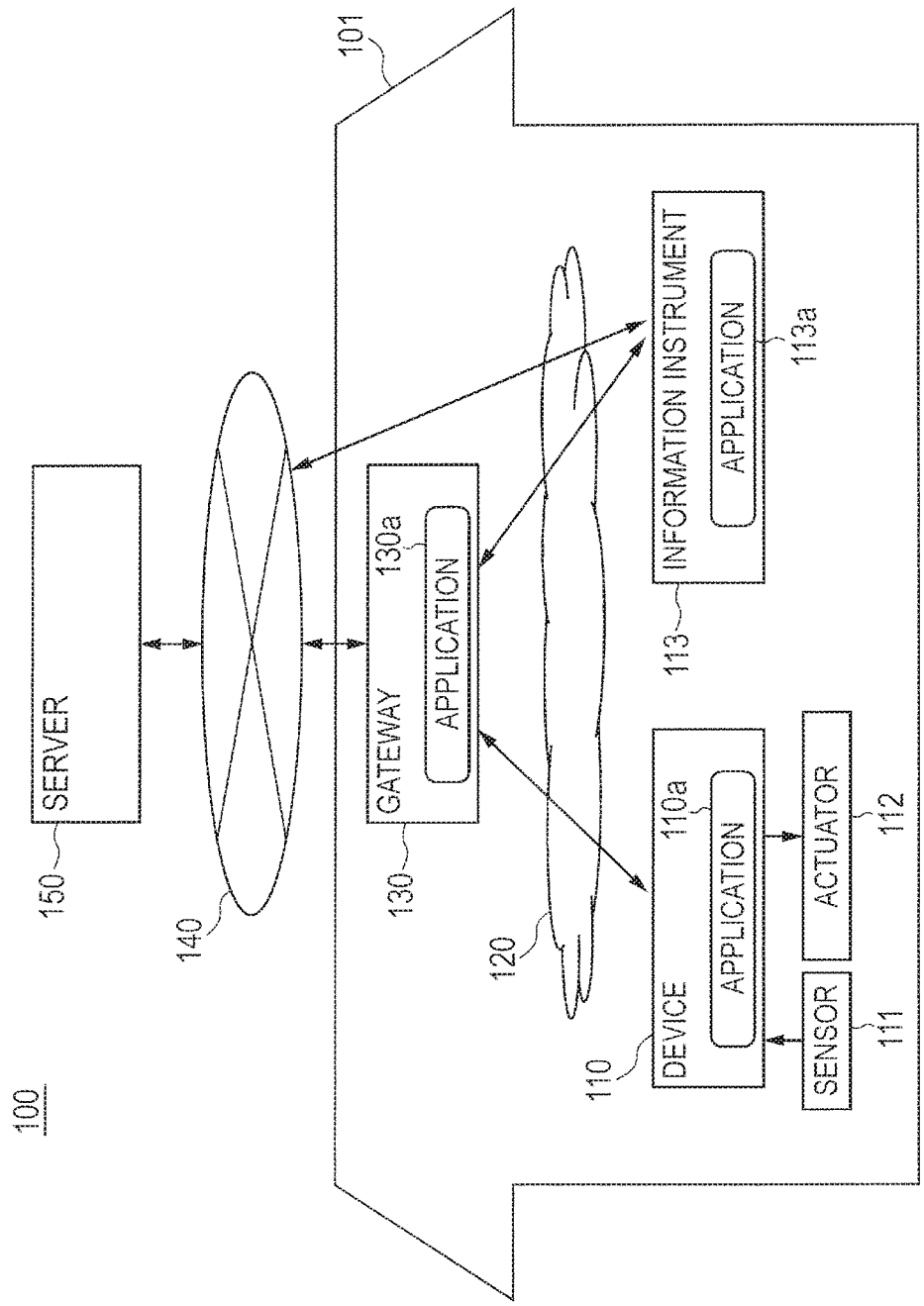
FIG. 1 schematically illustrates an M2M system configuration.
Figures 2, 3:
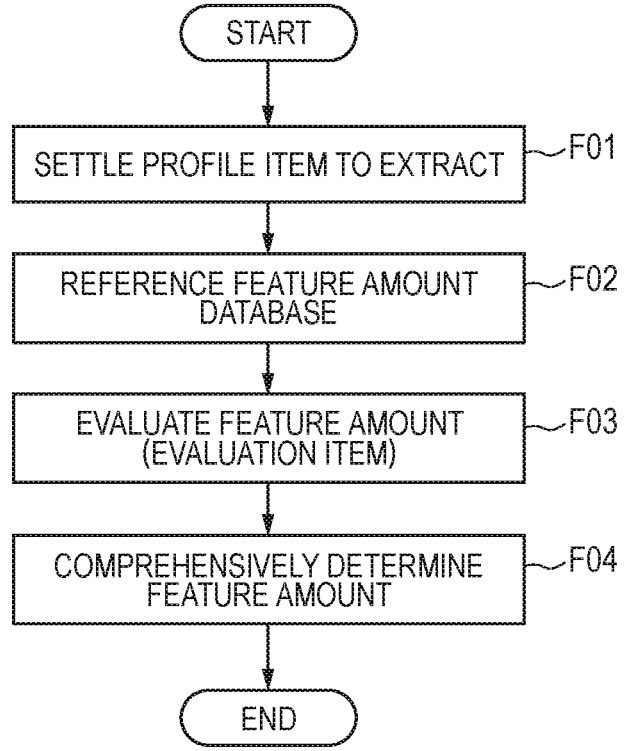
FIG. 2 illustrates example sensors.
FIG. 3 illustrates a flow to automatically extract profile information.

FIG. 2 schematically illustrates an M2M (Machine-to-Machine) system configuration equipped with a profile information system. A system 100 includes a device 110, a gateway 130, and a server 150. At least one device 110 is placed in a living space 101. The gateway 130 interacts with a plurality of devices 110 to collect and deliver data. The server 150 includes software that manages application programs installed on the gateway 130 or the device 110. The device 110 is coupled to a sensor 111 and/or an actuator 112. The device 110 collects information from the sensor 111 and controls the actuator 112. The actuator 112 widely signifies an entity that operates based on control directives from the device 110 or a higher-order unit. The actuator 112 can use any drive mechanism whether it is physical or electrical. The device 110 is coupled to the gateway 130 via an area network 120. The gateway 130 collects sensor data from a plurality of devices 110 coupled to the area network 120. The gateway 130 is coupled to a server 105 via an access network (IP network) 140. Application programs for the gateway 130 or the device 110 are updated via the access network 140 and the area network 120.

The device 110 may be included in the equipment instruments such as home electronics, lighting apparatuses, various detectors, and meters in the living space 101. The device 110 may be coupled to the equipment instrument as an external communication instrument that includes sensors or actuators. The sensor data includes a usage log concerning the equipment instrument as the device 110 as well as sensing data from the sensor 111.

In the system 100, the gateway 130 and the device 110 each include an application capable of providing functions and services at each level. For example, a device-level application 110*a* can provide a function of detecting the existence of a person in a room and automatically turning on a lighting apparatus (actuator) that includes a motion detector. Meanwhile, a gateway-level application 130*a* can operate one device in cooperation with sensor data from a plurality of devices. In this case, the devices 110 transmits sensor data to the gateway 130. The gateway 130 transmits a directive to a device to be controlled, namely, to the actuator 112 of the device. Various application fields aggressively research system architectures and service propositions based on the M2M system. Development of sensors used for any system architecture is also in progress.

One of the application fields examines an attempt to place various sensors in the living space to automatically adjust equipment instruments such as air conditioners or lighting apparatuses or provide services to watch dwellers or give health advices. FIG. 2 illustrates the sensors 111 used for the services. As illustrated in FIG. 2, many sensors are developed to collect not only information about things or environments but also information about persons. For example, a ToF (Time of Flight) can be used as a motion detector to detect not only the existence of a person but also the motion of the person. A vital sensor to sense human pulses is under development as a wearable sensor (contact-type) in the form of a wristband attached to a user and a contactless vital sensor. The contactless vital sensor irradiates microwaves or millimeter-waves to a biological body and detects biological information such as pulses and breathing based on phase information from reflected waves. The contactless vital sensor can acquire these types of information without being attached to a user, reducing loads on the user.

The gateway 130 can couple with not only the device but also an information instrument 113 such as a PC (Personal Computer), a tablet computer, or a smartphone via the area network 120. The information instrument 113 can be also coupled with the access network 140. The information instrument 113 can maintain and execute the gateway-level application 130*a* to couple with not only the gateway 130 but also the device 110 via the area network (such as wireless LAN). An information processing apparatus capable of coupling with the server 150 via the access network (IP network) can provide functions of embodiments described below.

First Embodiment

The first embodiment focuses on a fact that the system 100 acquires information about activities or physical conditions of dwellers from sensor data. The system automatically extracts the profile information from a usage situation log concerning equipment instruments such as home electronics or sensing data from sensors in a living space. The sensor data is analyzed to automatically extract the profile information such as health conditions, lifestyle, and stress of dwellers. The description below uses the term "feature amount" to denote an evaluation item used to extract the profile information.

According to the first embodiment, the gateway-level application 130*a* automatically extracts a profile. This is because the objective is to extract the profile information about an individual person. It is advantageous to process the related information without being submitted to the access network 140 from the viewpoint of information security. However, it is advantageous to continually update a feature amount evaluation algorithm to be described later or parameters such as reference values used for the algorithm each time they are improved. The server 150 remotely updates the contents of the application program 130*a* for the gateway 130. Sensor data used for the feature amount evaluation may be stored in the device 110 or collectively in the gateway 130. In the description below, the expression such as "referencing the feature amount database" signifies accessing a sensor data database maintaining the sensor data used for the feature amount evaluation and does not attach importance to where the database is stored in the living space 101.

FIG. 3 illustrates a flow to automatically extract the profile information. The flow settles a profile item to extract (F01). A feature amount evaluation algorithm is predetermined for each application and determines what feature amount is used as a basis to settle the profile item. The flow references a sensor data database ("feature amount database") corresponding to the feature amount (evaluation item) in order to extract the profile information (F02) and evaluates the feature amount (evaluation item) (F03). The feature amounts (evaluation items) and sensor data to be used vary with the profile items settled in F02 and F03. The feature amounts are comprehensively determined to extract the profile information (F04). The description below explains examples of extracting the profile information. The methods are given as examples and impose no limitations.

FIG. 4A illustrates a feature amount table 401 to extract the profile information "health." This example uses five evaluation items (sleep period, sleep depth, blood pressure, weight change, and complexion change) as feature amounts. Each evaluation item is provided with three-level criteria to get a score. Each evaluation item is scored based on sensor data (measured values) acquired from various sensors. Each evaluation item is highly scored as the health condition improves. The criterion for each evaluation item is designed to be capable of quantitative determination based on sensor data. The sum of scores for each evaluation item is evaluated against a determination table 402 illustrated in FIG. 4B to extract the profile information ranging from "very healthy" to "unhealthy."

Similarly, FIG. 5A illustrates a feature amount table 501 to extract profile information "stress." This example also provides five evaluation items (emotion, pulse change, sleep depth, activities, and shoulder stiffness) as feature amounts. Each evaluation item is provided with three-level criteria to get a score. Each evaluation item is scored based on sensor data (measured values) acquired from various sensors. Each evaluation item is highly scored as the stress decreases. The criterion for each evaluation item is designed to be capable of quantitative determination based on sensor data. The sum of scores for each evaluation item is evaluated against a determination table 502 illustrated in FIG. 5B to extract the profile information ranging from "no stress" to "high stress."

Similarly, FIG. 6A illustrates a feature amount table 601 to extract profile information "personality." This example also provides five evaluation items (change in wake time, change in lights-out time, the number of times to brush teeth per day, average time to go home, and messy condition (change) of a room) as feature amounts. Each evaluation item is provided with three-level criteria to get a score. Each evaluation item is scored based on sensor data (measured values) acquired from various sensors. Each evaluation item is highly scored as a user is highly estimated to be well-organized. The criterion for each evaluation item is designed to be capable of quantitative determination based on sensor data. The sum of scores for each evaluation item is evaluated against a determination table 602 illustrated in FIG. 6B to extract the profile information ranging from "well-organized" to "negligent."

The above-mentioned feature amount evaluation algorithm provides examples of extracting the profile information based on the predetermined tables. It is also possible to extract the profile information using the flow of a determination process based on sensor data. FIG. 7 illustrates the flow of a determination process to extract profile information "hobby." This example extracts information about where an object person frequently spends the time. The process determines whether the object person frequently stays in a living room (S701). This can be detected by a technique such as facial recognition using a camera, voice-print recognition based on a voice, or human detection using a ToF sensor. If the object person frequently stays in the living room, the process extracts information about activities of the object person in the living room. If the object person frequently reads books, the process determines that the hobby is reading (S702). This determination can use a technique such as posture recognition using a camera or human movement detection using a ToF sensor. If the object person watches a lot of television, the process determines that the hobby is television viewing (S703). This determination can use a technique such as posture recognition using a camera or a television viewing history. Similarly, other determination processes are provided to determine hobbies available in the living room. If the object person spends little time in the living room, the process determines whether the object person frequently stays in the object person's own room (S704). Detection techniques are comparable to those available in S701. If the object person frequently stays in the object person's own room, control proceeds to the flow of a process to determine hobbies in the object person's own room. If the object person frequently goes outside, control proceeds to the flow of a process to determine hobbies outside the living space.

Figure 8:
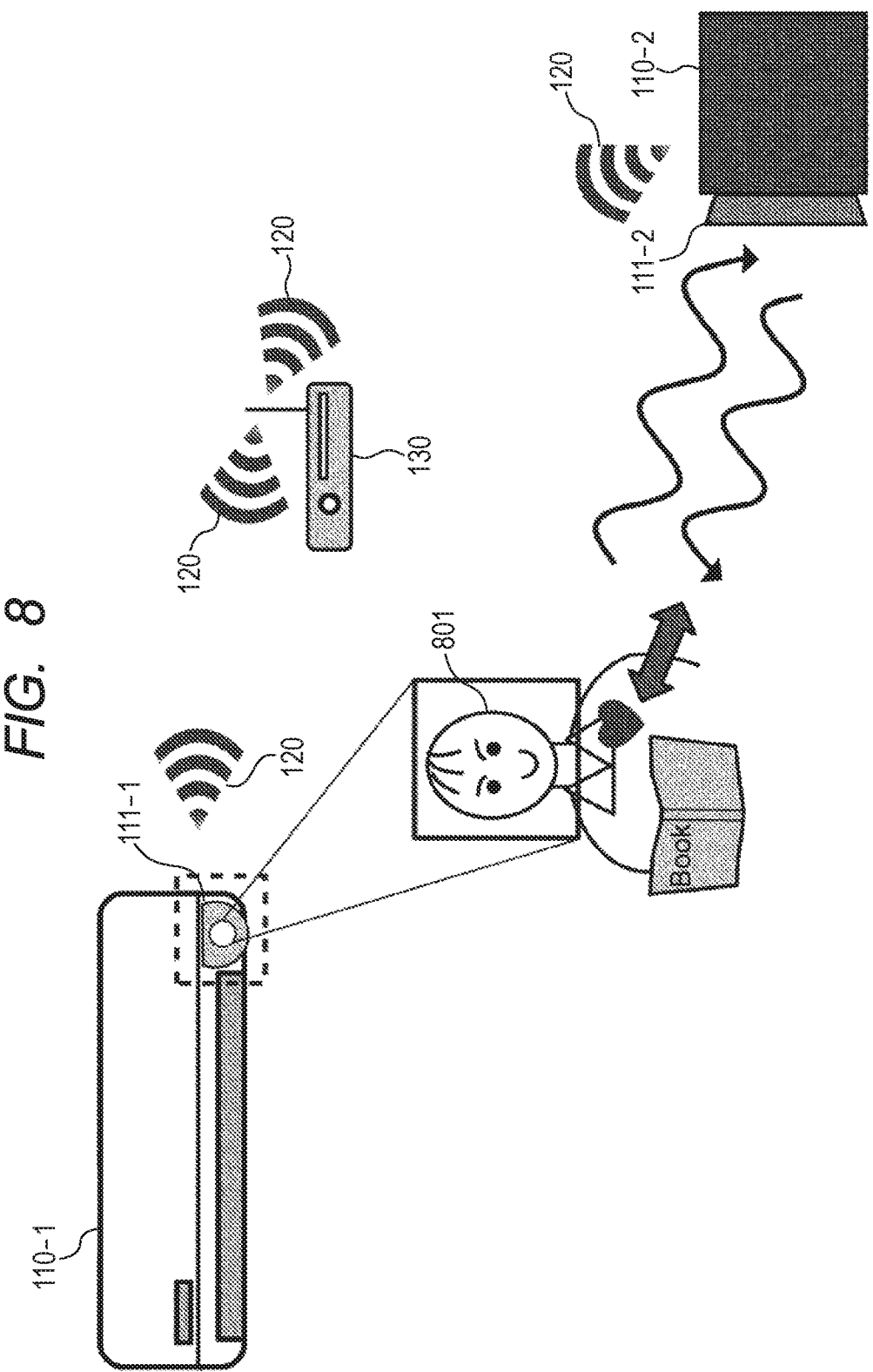
FIG. 8 illustrates an image of embodying a profile information system.

FIG. 8 illustrates an image of embodying the profile information system. The system extracts information about a dweller A 801 by using a camera 111-1 as a sensor attached to an air conditioner (device) 110-1 and a contactless vital sensor 110-2. Video from the camera 111-1 enables facial recognition to determine A as an object, emotion recognition to determine the emotion of A from the expression of A, and posture recognition to determine the posture of A. The vital sensor 110-2 irradiates millimeter-waves to dweller A 801, making it possible to measure pulsation or heartbeat based on phase information from a reflected wave. Sensor data from the sensors is transmitted to the gateway 130 via the area network 120 such as wireless LAN and is stored. The gateway 130 uses an intrinsic application program to extract the profile information.

The device 110 and the gateway 130 each include an application program. The device 110 and the gateway 130 each are not assigned particular information processing needed to extract the profile information. For example, video from the camera 111-1 may be transmitted to the gateway 130. The gateway may perform a video recognition process and perform the feature amount determination based on the process. Alternatively, the device (air conditioner) may perform a video recognition process. The gateway may perform the feature amount determination based on a recognition result. The distributed processing can reduce the amount of processing at the gateway.

According to the above-mentioned examples, the feature amount evaluation algorithm extracts the profile information by using the table and the determination process for determination. However, machine learning may be used to determine the feature amount. In this case, updating the machine learning weighting as needed can improve the accuracy of determining the feature amount can be improved.

Second Embodiment

According to the second embodiment, the system 100 evaluates the reliability of self-reported profile information based on a usage situation log about equipment instruments such as home electronics in the living space or sensing data from the sensors. The profile information verification system maintains self-reported profile information supplied by a dweller as input information. The input information is combined with the flow in the first embodiment to verify (or evaluate the reliability of) the self-reported profile information. The system outputs verified profile information referred to as "profile information with reliability information."

Figure 9:
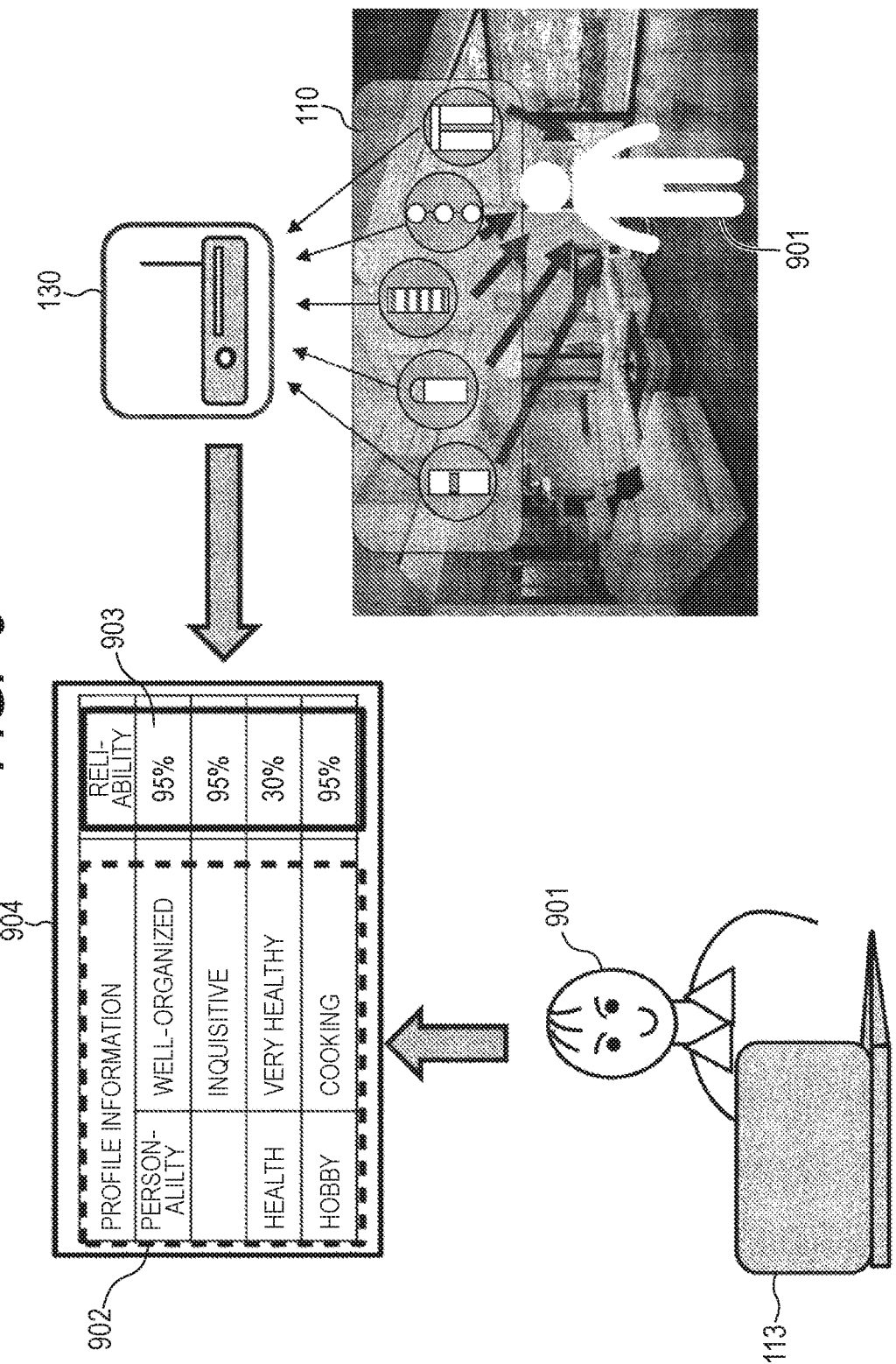
FIG. 9 illustrates an image of embodying a profile information verification system.

FIG. 9 illustrates an image of embodying the profile information verification system. A dweller 901 self-reports and generates self-reported profile information 902 by using the information instrument 113. The gateway 130 extracts the profile information about the dweller 901 from the sensor data acquired from each equipment instrument 110 by using the flow to automatically extract the profile information described in the first embodiment. The automatically extracted profile information about the dweller is compared with the self-reported profile information 902 supplied by the dweller to calculate reliability 903 of each profile item in the self-reported profile information 902 supplied by the dweller.

The reliability information based on the objective sensor data is added to the self-reported profile information about the dweller. It is possible to improve the reliability of the self-reported profile information about the dweller.

Figure 10:
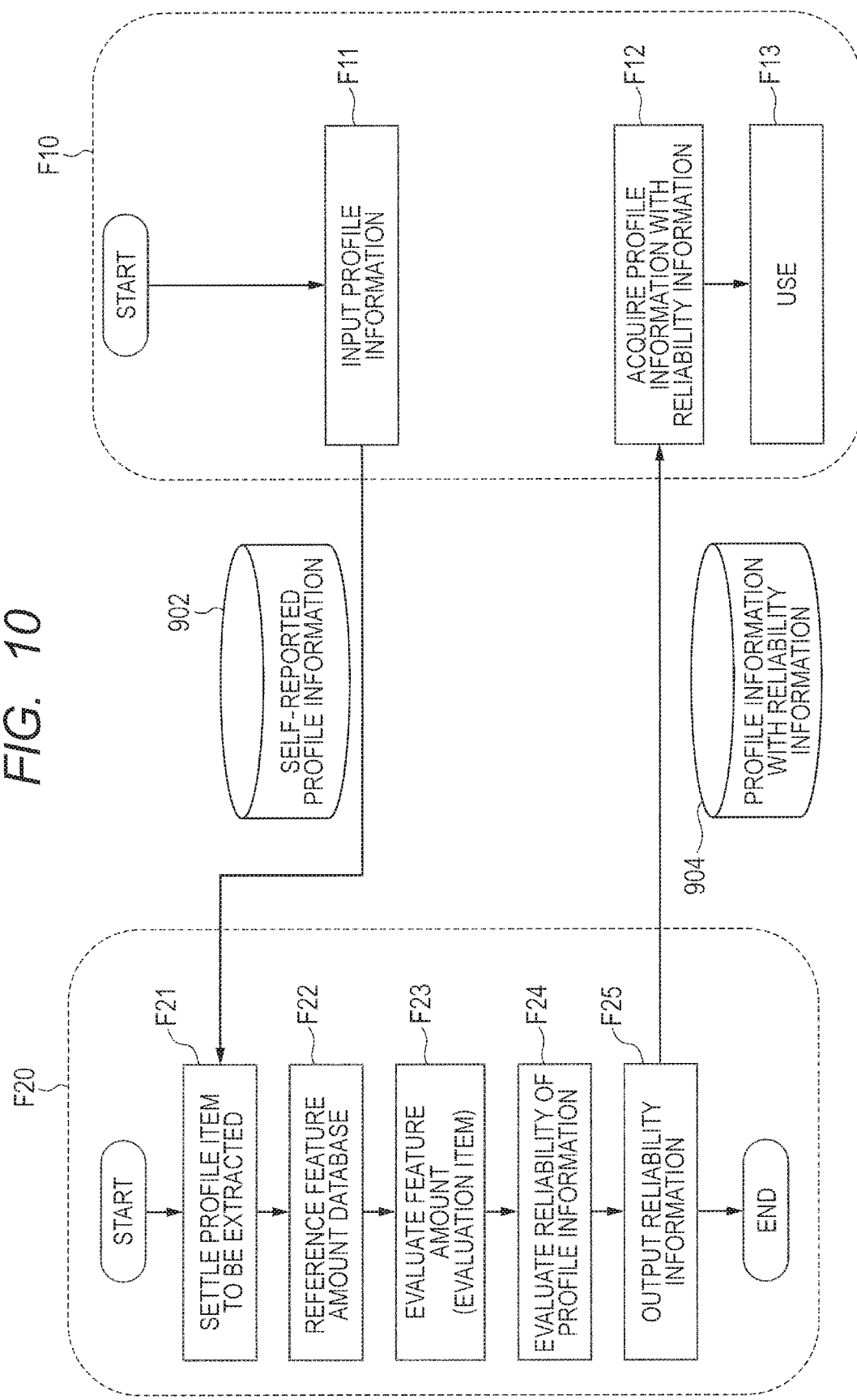
FIG. 10 illustrates flows to verify the profile information.

FIG. 10 illustrates flows to verify the profile information. An application 113*a* for the information instrument 113 performs flow F10 (right side) in FIG. 10 to input the self-reported profile information. The application 113*a* is available as an application used for job-placement services or SNS over the Internet. Flow F10 is installed as a profile information input routine of the application. The user (dweller) inputs profile information (F11).

Flow F20 (left side) in FIG. 10 provides a profile information verification flow executed in the application program 130*a* for the gateway 130. Flow F20 verifies the self-reported profile information 902 self-reported by the user. The information instrument 113 initiates the application 130*a* for the gateway 130 to verify the self-reported profile information 902.

Flows F21, F22, and F23 in flow F20 are processed similarly to flows F01, F02, and F03 described in the first embodiment (FIG. 3) and automatically extract the profile information based on sensor data from the equipment instrument in the living space 101. Flow F21 settles a profile item to be automatically extracted based on the input self-reported profile information 902. The flow references a sensor data database (feature amount database) corresponding to the feature amount (evaluation item) to extract the profile information (F22) and evaluates the feature amount (evaluation item) (F23). A process comparable to flow F04 in the first embodiment is performed to extract the profile information based on the comprehensive determination of the feature amount. Flow F24 compares the extracted profile information with the self-reported profile information 902 to evaluate the reliability of each profile item in the self-reported profile information. Flow F25 outputs the evaluated reliability information to the information instrument 113 and terminates the verification flow. The user acquires the profile information with reliability information 904 (flow F12) and uses the profile information (flow F13).

Flow F24 evaluates the reliability of the profile information by comparing and verifying the automatically extracted profile information with the self-reported profile information. For example, suppose profile information "personality" is to be evaluated. As described with reference to FIGS. 6A and 6B in the first embodiment, the system automatically extracts the feature amount concerning the personality of the user. For example, the sum of scores ranging from 8 to 10 can evaluate high reliability in the input information "well-organized" self-reported by the user 901 illustrated in FIG. 9. The reliability evaluation method is not limited to the one illustrated in FIG. 9 but may be expressed as determination A or in percentage. Meanwhile, the input information is evaluated as being lowly reliable if the sum of scores ranges from 0 to 4 although the user 901 self-reports the input information "well-organized." The reliability of the other items can be evaluated by comparing and verifying the automatically extracted profile information and the self-reported profile information.

The above-mentioned method can improve the reliability of the profile information self-reported by the user. Some users may be unwilling to accept the profile information about themselves that is automatically extracted and estimated by the system. It is possible to alleviate such an adverse reaction and ensure the reliability of the profile information by combining self-submitted items with the information automatically extracted and estimated from sensor data.

Figure 11:
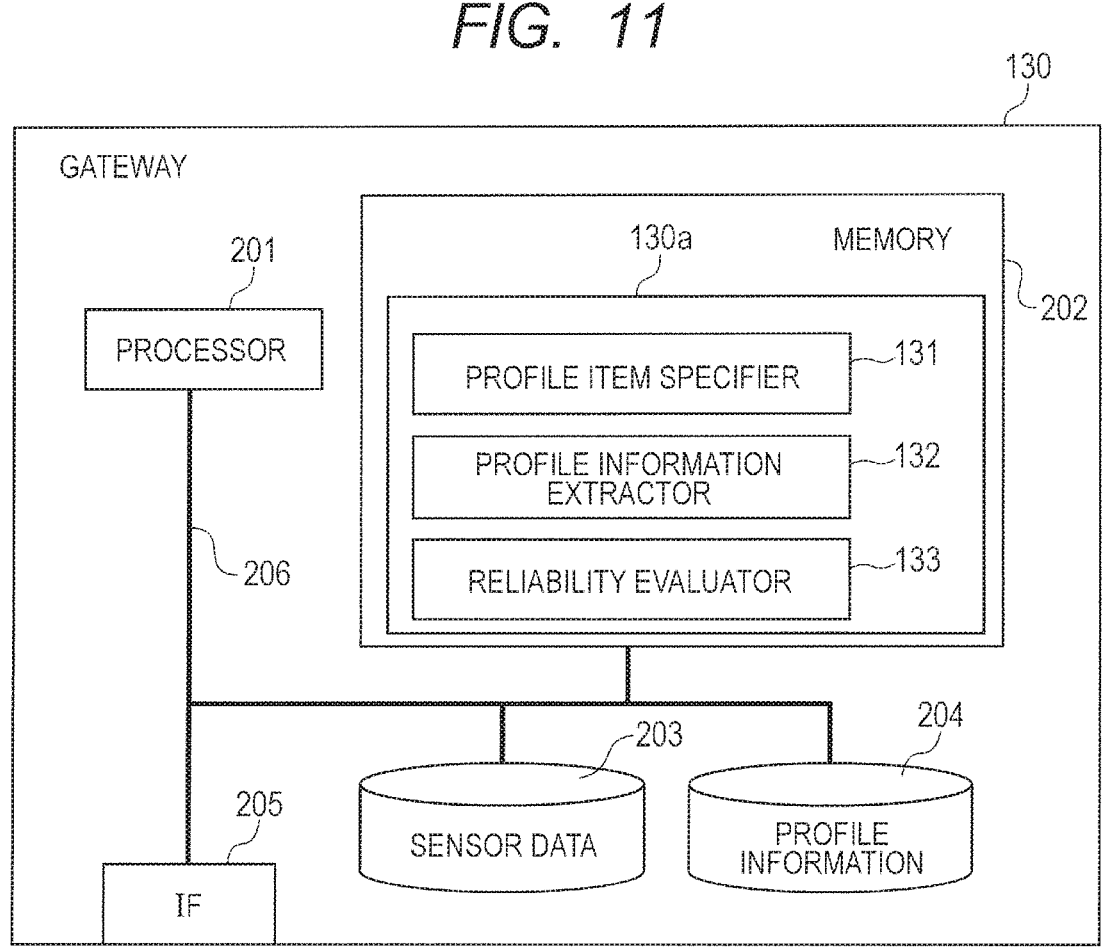
FIG. 11 illustrates a gateway hardware configuration.

FIG. 11 illustrates a hardware configuration of the gateway 130. The gateway 130 includes a processor 201, a memory 202, a sensor data database 203, a profile information database 204, an interface 205, and a bus 206 coupling these components. The interface 205 couples the gateway 130 to an area network or an access network. The sensor data database 203 stores sensor data transmitted from the device 110. The profile information database 204 stores the automatically extracted profile information or the self-reported profile information input from the information instrument 113. The processor executes the application program 130a loaded into the memory 202 from an unshown auxiliary storage to provide the function of automatically extracting or verifying the profile information as described in the first or second embodiment. The application program 130a includes a profile item specifier 131, a profile information extractor 132, and a reliability evaluator 133 (for the second embodiment). The profile item specifier 131 performs a process comparable to flow F01 in FIG. 3 or flow F21 in FIG. 10. The profile information extractor 132 automatically extracts the profile information about the profile items described with reference to FIGS. 4A through 7. The reliability evaluator 133 performs a process comparable to flows F24 and F25 in FIG. 10.

While there have been described the specific preferred embodiments of the present invention created by the inventors, it is to be distinctly understood that the present invention is not limited thereto but may be otherwise variously embodied within the spirit and scope of the invention.

What is claimed is:

1. A profile information system comprising:
a device that is coupled to a sensor; and
an information processing device that includes a processor that executes an application program,
wherein the application program includes a profile item specifier and a profile information extractor,
wherein the profile item specifier specifies a profile item,
wherein the profile information extractor evaluates each of a plurality of feature amounts associated with the specified profile item based on each criteria for the feature amounts and sensor data from the device respectively, and extracts profile information by comprehensively evaluating the plurality of feature amounts
wherein the sensor data comprises information about activities or physical conditions of dwellers,
wherein the profile information extractor extracts the profile information which comprises information about the dweller,
wherein the profile information system further comprises a first profile information database that stores self-reported profile information supplied from the dweller,
wherein the application program further includes a reliability evaluator,
wherein the profile item specifier specifies a profile item corresponding to the self-reported profile information, and
wherein the reliability evaluator evaluates the reliability of the self-reported profile information by comparing and verifying the self-reported profile information with the profile information extracted by the profile information extractor concerning the profile item for the dweller.

2. The profile information system according to claim 1, further comprising a second profile information database including a feature amount table,
wherein the profile item is associated with the plurality of feature amounts and each criteria for the feature amounts respectively, and
wherein the profile information extractor accesses the second profile information database with reference to the specified profile item to evaluate each of the plurality of feature amounts.

3. The profile information system according to claim 1, wherein the device is placed in a living space.

4. The profile information system according to claim 1, wherein the sensor data comprises sensing data from the sensor and a usage log concerning an equipment instrument as the device.

5. The profile information system according to claim 1, wherein the profile information extractor includes a feature amount evaluation algorithm corresponding to the profile item.

6. The profile information system according to claim 5, wherein a server coupled to the information processing device updates the feature amount evaluation algorithm as needed.

7. An information processing device comprising:
a sensor data database; and
a processor to execute an application program,
wherein the application program includes a profile item specifier and a profile information extractor,
wherein the profile item specifier specifies a profile item,
wherein the profile information extractor evaluates each of a plurality of feature amounts associated with the specified profile item based on each criteria for the feature amounts and the sensor data from the sensor data database respectively, and extracts profile information by comprehensively evaluating the plurality of feature amounts
wherein the sensor data comprises information about activities or physical conditions of dwellers,
wherein the profile information extractor extracts the profile information which comprises information about the dweller,
wherein the information processing device comprises a first profile information database to store self-reported profile information supplied by the dweller,
wherein the application program further includes a reliability evaluator,
wherein the profile item specifier specifies a profile item corresponding to the self-reported profile information, and
wherein the reliability evaluator evaluates the reliability of the self-reported profile information by comparing and verifying the self-reported profile information with the profile information extracted by the profile information extractor concerning the profile item for the dweller.

8. The information processing device according to claim 7, further comprising a second profile information database including a feature amount table,
wherein the profile item is associated with the plurality of feature amounts and each criteria for the feature amounts respectively, and
wherein the profile information extractor accesses the second profile information database with reference to the specified profile item to evaluate each of the plurality of feature amounts.

9. The information processing device according to claim 7, wherein the sensor data is collected from a device coupled to a sensor.

10. The information processing device according to claim 9, wherein the device is placed in a living space.

11. The information processing device according to claim 7, wherein the sensor data comprises sensing data from the sensor and a usage log concerning an equipment instrument as the device.

12. The information processing device according to claim 7, wherein the profile information extractor includes a feature amount evaluation algorithm corresponding to the profile item.

13. The information processing device according to claim 12, wherein a server updates the feature amount evaluation algorithm as needed.

* * * * *